Patented Nov. 27, 1928.

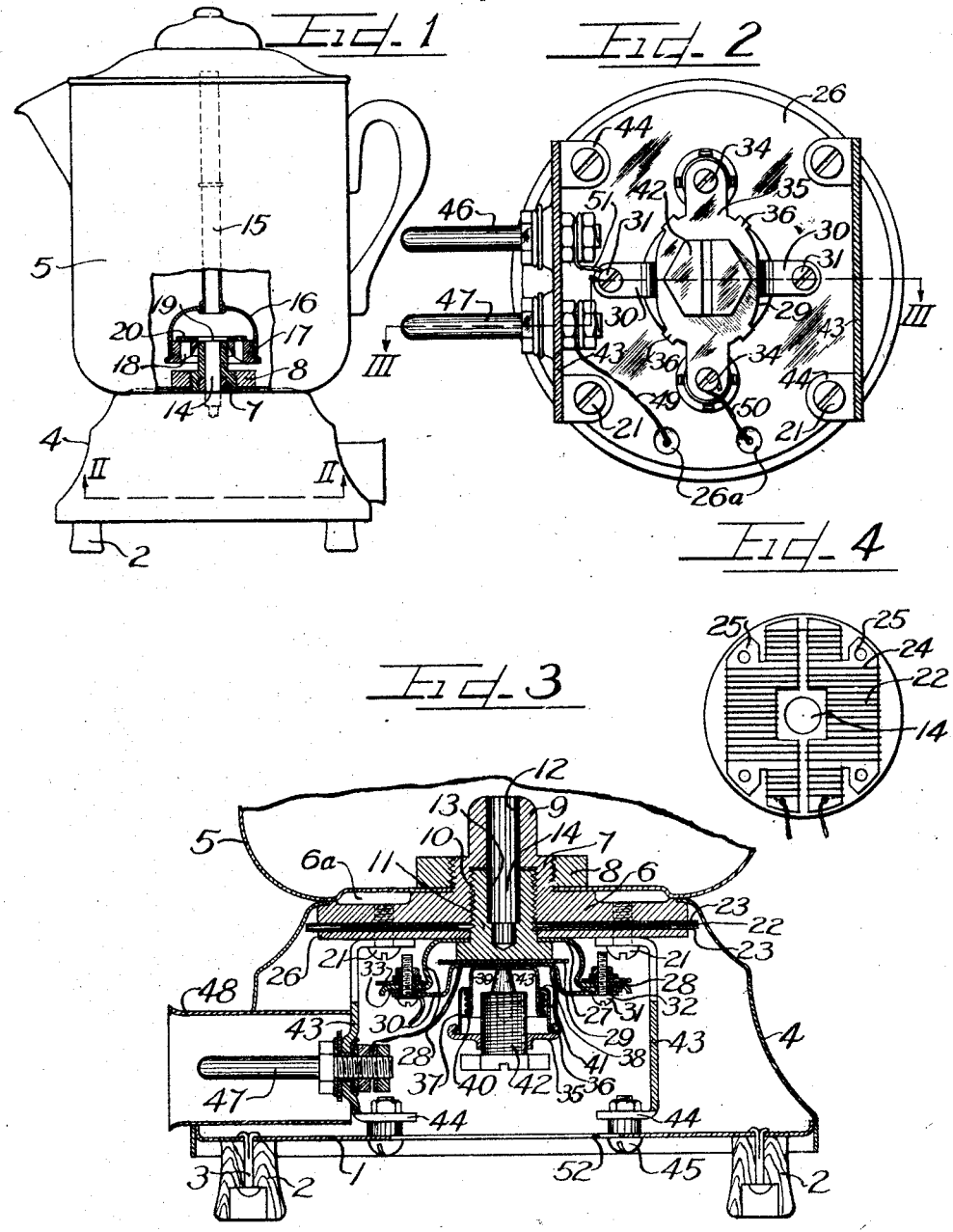

1,693,364

UNITED STATES PATENT OFFICE.

ALFRED BERSTED AND MARTIN BERSTED, OF CHICAGO, ILLINOIS.

ELECTRIC HEATER FOR PERCOLATORS AND THE LIKE.

Application filed April 23, 1927. Serial No. 185,938.

This invention relates to improvements in electrically heated utensils, and more particularly to such a utensil having an improved heating unit therein which is adapted to more quickly heat the contents of the utensil, and in which the circuit will be more quickly and positively broken, if the temperature becomes excessively high or the current dangerously increases, than devices of this kind heretofore known.

In the previously developed devices of this character, especially those for use with percolators for coffee or the like, various circuit breaking means are employed which are always directly in the circuit and which are objectionable in that they do not quickly and positively break the circuit when excessively high temperatures and rises in current occur. Moreover, these former devices are somewhat unsatisfactory due to the length of time required to percolate the liquid.

With these objections in view, it is accordingly an object of this invention to provide means associated with a percolator or the like to percolate the contents thereof in a minimum length of time.

Still another object of this invention is to provide an electric heater having means therein for quickly and positively breaking the circuit on the occurrence of excess temperature or rises in current.

A further object of this invention is to provide an electric heater having fusible circuit breaking means therein which are not directly in the electric circuit.

Other and further important objects of this invention will be apparent from the disclosures in the specification and accompanying drawings.

This invention (in a preferred form) is illustrated in the drawings and hereinafter more fully described.

On the drawings:

Figure 1 is a side view in elevation, with parts in section, of a percolator embodying features of this invention.

Figure 2 is a bottom plan view taken substantially along line II—II of Figure 1.

Figure 3 is a fragmentary sectional view in elevation taken substantially along line III—III of Figure 2.

Figure 4 is a diagrammatic view of the heating element.

As shown in the drawings:

The reference numeral 1 indicates a bottom plate which is provided with the usual heat insulating buttons or legs 2 secured thereto in any desired manner or (as shown) by split rivets 3. Removably engaging with and mounted on the bottom plate 1 is a base 4, upon which is mounted the usual percolator body 5.

The body 5 is secured to the base 4 by means of a cold water plate 6 engaging the upper periphery of the base 4 and having an integral upwardly extending threaded portion 7 which passes through an aperture in the bottom of the body 5, and a nut 8 engaged on the threaded portion 7, as shown in Figure 3. An annular air space $6^a$, between the body portion 5 and the plate 6, tends to prevent direct conduction of heat from the plate to the liquid in said body, permitting concentration of heat at the water pocket. A boss 9 integral with the portion 7 and the plate 6 extends above the threaded portion 7. In alignment with the boss 9 is an interiorly threaded recess 10 in the bottom of the plate 6 into which a cap screw 11 is threaded. The boss 9 has a passage 12 therethrough which engages with a recess 13 in the cap screw 11 thereby forming a water pocket 14. Removably resting upon the boss 9 is the usual percolating valve comprising the tube 15 to which is secured the inverted interiorly threaded cup member 16 in which is engaged the nut 17, perforated as at 18, and having a central aperture 19 therein adjacent the water pocket 14. A loose washer 20 is retained in the cup member 16 by the perforated nut 17.

As disclosed in Figure 1 the liquid in the body 5 upon being heated will pass upwardly through the passage 18 elevating the loose washer 20 and continuing to the cup member 16 and thence up the tube 15. Due to the central aperture 19 in the nut 17 the liquid in the water pocket 14 may pass directly into the cup member 16.

Secured to the plate 6 by the screws 21 threaded thereinto is a heating element 22 disposed upon either side of which, of course, are insulating plates 23. It is to be noted, as disclosed in Figures 3 and 4, that the heating element is composed of the usual high resistance wire 24 wound upon a split irregularly shaped flat core 25, and entirely surrounds the lower extremity of the water passage 14 being separated therefrom only by the radial thickness of the cap screw 11. Disposed adjacent the under side of the lower insulation plate 23 is a metal plate 26 which is provided with apertures 26ª therein. Adjacent the plate 26 and supported thereagainst by the head of the cap screw 11, is a supporting member 27 having integral angular supporting brackets 28 depending therefrom. Adjacent the under side of the head of the cap screw 11 is an insulating disc 29 supported by a depending bracket 30 of good conducting material which is mounted to the brackets 28 of the member 27 by bolts 31. As shown in Figure 3 the bracket 30 is insulated from the bolts 31 and from the supporting brackets 28 by insulating bushings 32 and insulating washers 33 respectively. Mounted to a pair of brackets (not shown in the drawings), depending from the supporting member 27, diametrically opposite to the brackets 28, by bolts 34, is a substantially flat conductive strip 35 having upwardly extending and angularly bent lugs 36 thereon. The lugs 36 engage the bottom of a sleeve 37 which is provided at its upper end with an interiorly extending annular flange 38. Slidably mounted in the sleeve 37 is an inverted cup 39 having an outwardly extending annular flange 40 on the lower periphery thereof. A compression spring 41 is held in position between the cup 39 and the sleeve 37 by flanges 38 and 40, and acts to force the cup 39 downwardly away from contact with the bracket 30. A screw plug 42 having a tip 43 of fusible material imbedded therein, is threaded through the bottom of the strip 35. The tip 43 presses against the cup 39, whereby the cup 39 is forced in contact with the bracket 30 against the action of the spring 41.

Separating the bottom plate 1 from the metal plate 26 are supporting brackets 43 each having a number of angularly disposed lugs 44 integral therewith. The brackets are secured at their upper ends by the screws 21 threaded into the cold water plate 6 and are secured to the bottom plate 1 by the screws 45. Mounted in one of the brackets 43 in the usual manner and insulated therefrom is a pair of terminal posts 46 and 47 around which the usual terminal sleeve 48 is provided in the base 4. A relatively large aperture 52 is provided in the bottom plate 1 to permit the plug screw 42 to be readily and easily replaced with a new plug screw as occasion demands.

A conductor 49, in continuation of the resistance wire 24, passing through one of the apertures 26ª connects terminal post 47 with the heating element 22, and a similar return conductor 50, passing through the other aperture 26ª, connects the heating element 22 with the strip 35. The current passes through the strip 35 which, of course, is insulated in the usual manner from the bolts 34, upwardly through the sleeve 37 and cup 39 into the bracket member 30. A conductor 51 connects the bracket member 30 with the terminal post 46 thereby completing the circuit through the device.

In operation the usual plug is slipped on terminal posts 46 and 47 and the heating element 22 since it surrounds the lower portion of the water pocket 14, very quickly heats the contents of the body 5. If for any reason the temperature rises to a dangerous point, the fusible tip 43 melts and the spring 41 pushes the cup 39 downwardly away from the bracket 30 thereby causing a break in the circuit and preventing damage to all other parts of the device. The inverted cup 39 acts as a protective shield for the fusible tip 43, and the cup together with the bracket 35 retains the molten metal of the tip 43 when the latter is melted. It is to be noted that the plug screw 42 and the fusible tip 43 are not directly in the circuit, but if by accident the current dangerously increases, the fusible tip 43 will be immediately affected since it contacts with the cup 39 through which the current passes and will operate to break the circuit as previously described. Obviously, the plug screw 42 may be easily replaced, through the aperture in the base, with a new plug screw equipped with a fusible tip.

From the foregoing it is apparent that we have provided an electric heater associated with a percolator or similar utensil, adapted to very rapidly heat the contents of the utensil, having a safety device therein which will quickly and positively break the circuit when the temperature rises excessively or the amperage suddenly increases. There is no danger whatever of the circuit becoming again closed until new fusible means are inserted into the device. Moreover the device is durable, readily accessible to all parts thereof, easily assembled or disassembled, and may be manufactured at minimum cost.

We are aware that numerous details of construction may be varied through a wide range without departing from the principles of this invention and we therefore do not purpose limiting the patent granted otherwise than necessitated by the prior art.

We claim as our invention:

1. In a device of the class described, a heating element, a conductive member and a contact member adjacent thereto, both in circuit with said element, resilient means associated with said contact member, and fusible means forcing said contact member against said conductive member in opposition to the action of said resilient means.

2. In a heater having an electric circuit therethrough, a heating element, a conductive member, both in said circuit, a fusible member, resilient means associated with said fusible member, and a protective shield also in said circuit and enclosing said fusible member, said fusible member retaining said shield in contact with said first mentioned member against the action of said resilient means.

3. In combination, a heating element, a conductive member, a sleeve, a contacting member slidable in said sleeve, a bracket supporting said sleeve, all in circuit with said element, a spring in said sleeve normally urging said contacting member away from said conductive member, threaded means associated with said bracket, and a fusible tip on said means and abutting said contacting member, said means holding said contacting member against said conductive member in opposition to said spring.

4. In a device of the class described, a heating element, a conductive member, a sleeve, a strip supporting said sleeve, an inverted cup slidable in said sleeve, all in circuit with said element, a compression spring normally urging said cup away from said conductive member, a plug screw threaded in said strip and extending in said sleeve, and a fusible tip on said screw abutting said cup and forcing the cup into contact with said member against the action of said spring.

5. In combination, a heating element, a conductive member and a cup-like conductive shield both in circuit with said element, a fusible member, and resilient means associated with said fusible member, said fusible member holding said shield in contact with said conductive member, against the action of said resilient means, and said shield protecting said fusible member.

6. In combination, a heating element, a pair of conductive members in circuit with said element, resilient means normally tending to separate said members to break the circuit through said element, and fusible means for maintaining said members in contact with each other against the action of said resilient means.

In testimony whereof, we have hereunto subscribed our names.

ALFRED BERSTED.
MARTIN BERSTED.